(12) United States Patent
Ueda

(10) Patent No.: US 8,850,171 B2
(45) Date of Patent: Sep. 30, 2014

(54) MULTITHREADED PARALLEL EXECUTION DEVICE, BROADCAST STREAM PLAYBACK DEVICE, BROADCAST STREAM STORAGE DEVICE, STORED STREAM PLAYBACK DEVICE, STORED STREAM RE-ENCODING DEVICE, INTEGRATED CIRCUIT, MULTITHREADED PARALLEL EXECUTION METHOD, AND MULTITHREADED COMPILER

(75) Inventor: Kyoko Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 417 days.

(21) Appl. No.: 13/319,848

(22) PCT Filed: Jun. 3, 2011

(86) PCT No.: PCT/JP2011/003161
§ 371 (c)(1),
(2), (4) Date: Nov. 10, 2011

(87) PCT Pub. No.: WO2011/158460
PCT Pub. Date: Dec. 22, 2011

(65) Prior Publication Data
US 2012/0239914 A1 Sep. 20, 2012

(30) Foreign Application Priority Data
Jun. 14, 2010 (JP) ................................. 2010-135300

(51) Int. Cl.
*G06F 9/52* (2006.01)
(52) U.S. Cl.
CPC ........................................ *G06F 9/52* (2013.01)
USPC ........................................................ 712/241

(58) Field of Classification Search
CPC combination set(s) only.
See application file for complete search history.

(56) References Cited

U.S. PATENT DOCUMENTS

| | | | |
|---|---|---|---|
| 5,437,034 A | 7/1995 | Tanaka et al. | |
| 6,463,580 B1 * | 10/2002 | Wilkerson | 717/149 |
| 6,848,097 B1 * | 1/2005 | Alverson et al. | 717/124 |
| 7,076,776 B2 * | 7/2006 | Kim et al. | 717/160 |
| 7,171,544 B2 * | 1/2007 | Bera | 712/216 |
| 7,302,676 B2 * | 11/2007 | Schmitt et al. | 717/132 |
| 2007/0169057 A1 * | 7/2007 | Silvera et al. | 717/160 |
| 2008/0320247 A1 * | 12/2008 | Morfey et al. | 711/154 |
| 2010/0031241 A1 * | 2/2010 | Schwartz | 717/149 |

FOREIGN PATENT DOCUMENTS

| | | |
|---|---|---|
| JP | 4-286031 | 10/1992 |
| JP | 5-181687 | 7/1993 |

(Continued)

OTHER PUBLICATIONS

International Search Report issued Aug. 2, 2011 in International (PCT) Application No. PCT/JP2011/003161.

*Primary Examiner* — Eric Coleman
(74) *Attorney, Agent, or Firm* — Wenderoth, Lind & Ponack, L.L.P.

(57) ABSTRACT

When a temporary data storage unit 104 stores a value of "3" and an iteration number of "3", and a data updating management unit 103 receives a value of "2" in combination with an iteration number of "2", a data updating management unit 103 determines not to overwrite information in the temporary data storage unit 104 with the received information by comparing the relative sizes of the iteration numbers. Subsequently, upon receiving information from the multithreaded execution unit 102 indicating that parallel execution is complete, the data updating management unit 103 copies the value of "3", stored by the temporary data storage unit 104, into the final data storage unit 105.

18 Claims, 22 Drawing Sheets

(56) References Cited

FOREIGN PATENT DOCUMENTS

| | | |
|---|---|---|
| JP | 7-114514 | 5/1995 |
| JP | 10-187522 | 7/1998 |
| JP | 11-194947 | 7/1999 |
| JP | 3269639 | 3/2002 |

* cited by examiner

FIG.3

| Relative sizes of iteration numbers | Determination result |
|---|---|
| i > i(th) | Do not overwrite |
| i ≤ i(th) | Overwrite |

FIG.4

Sample program 1

```
c=0;
b[0]=2;
b[1]=1;
b[2]=-1;
b[3]=-2;

for (a=0; a<4; a++){
 if (b[a]>-2){
   c=a+1;
   ...
  }
} printf("%d¥n",c);
```

Processing result

| 3 |
|---|

FIG.6A   Upon conclusion of first iteration
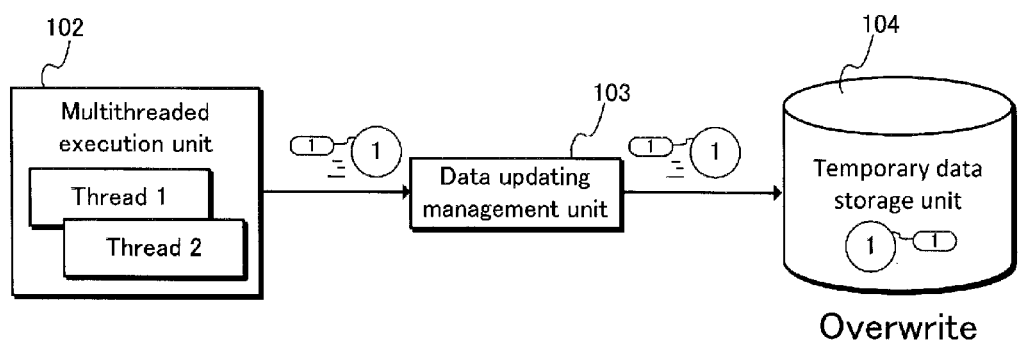
FIG.6B   Upon conclusion of third iteration
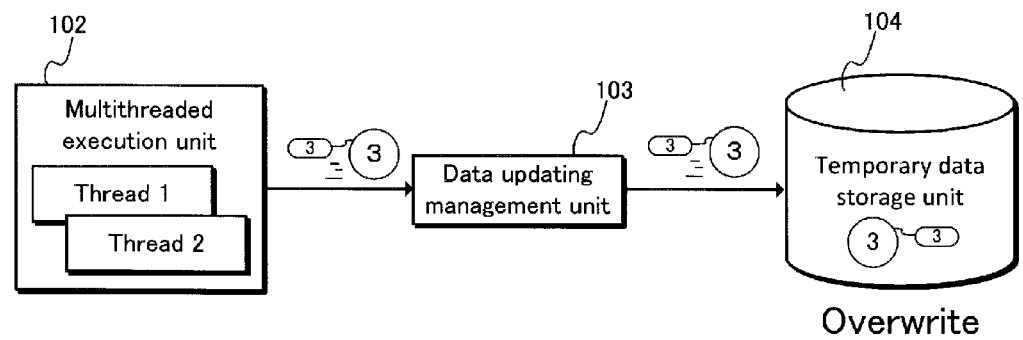

FIG. 7A  Upon conclusion of second iteration
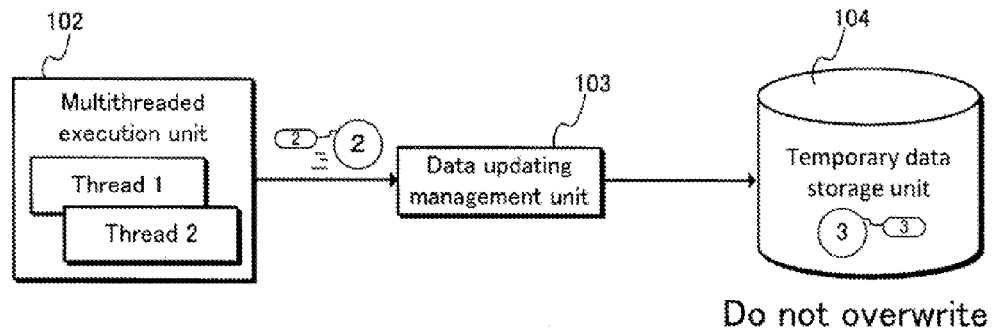
Do not overwrite
FIG. 7B  Upon conclusion of fourth iteration
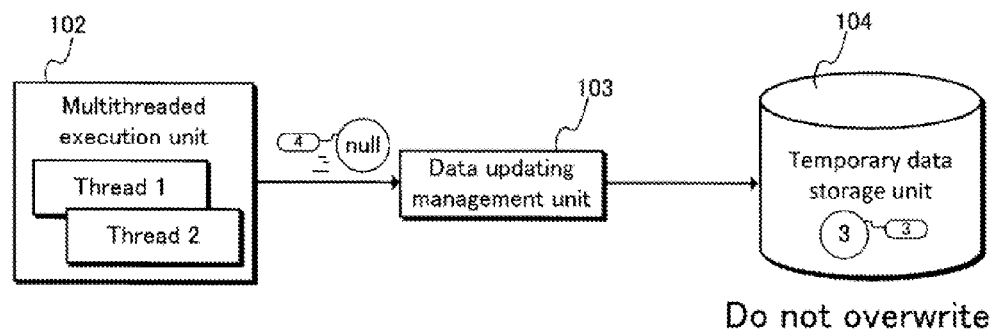
Do not overwrite
FIG. 7C  Upon completion of parallel execution
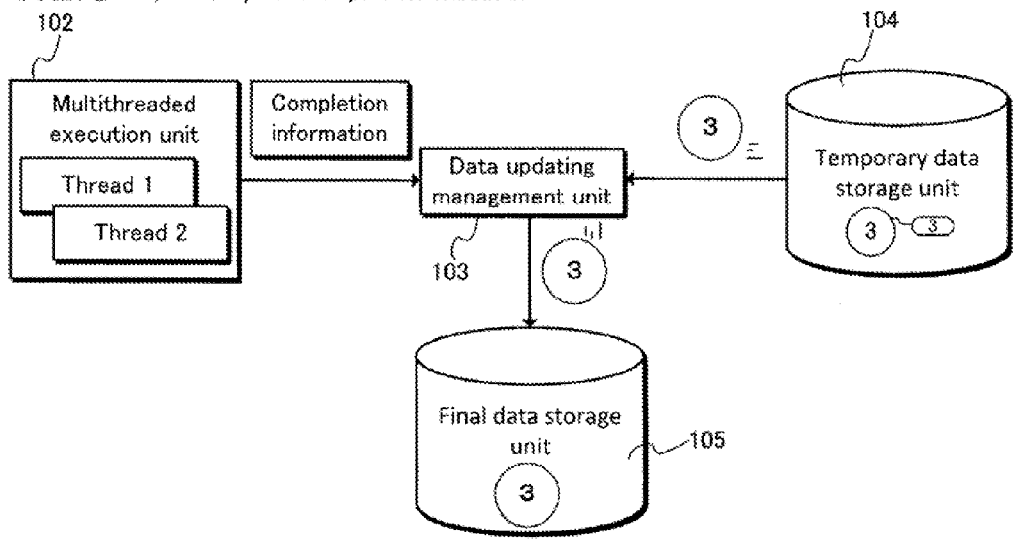

FIG.11

| | Break flag received by reception unit | Break flag stored in temporary data storage unit | Relative sizes of iteration numbers | Determination results |
|---|---|---|---|---|
| L1 | OFF | OFF | i > i(th) | do not overwrite |
| L2 | OFF | OFF | i ≤ i(th) | overwrite |
| L3 | OFF | ON | — | do not overwrite |
| L4 | ON | OFF | — | overwrite |
| L5 | ON | ON | i > i(th) | overwrite |
| L6 | ON | ON | i ≤ i(th) | do not overwrite |

MULTITHREADED PARALLEL EXECUTION DEVICE, BROADCAST STREAM PLAYBACK DEVICE, BROADCAST STREAM STORAGE DEVICE, STORED STREAM PLAYBACK DEVICE, STORED STREAM RE-ENCODING DEVICE, INTEGRATED CIRCUIT, MULTITHREADED PARALLEL EXECUTION METHOD, AND MULTITHREADED COMPILER

TECHNICAL FIELD

The present invention is related to technology for dividing repetitions of a loop into a plurality of threads and executing the repetitions in parallel.

BACKGROUND ART

When a loop is divided into a plurality of threads (i.e. multithreading), it is necessary for the final value of variables to be the same whether processing in parallel or processing sequentially. This is referred to as "guaranteeing final values".

The technology in Patent Literatures 1 and 2 is known technology for guaranteeing final values.

In Patent Literature 2, when a loop is parallelized, a region is provided for each parallel process. A code indicating whether a repetition is the last repetition is attached to the variables defined in each parallel process, and the variables are stored in the corresponding region.

After all of the parallel processes for the loop have completed, the variables corresponding to the process responsible for the last repetition are identified by referring to the code attached to the variables stored in the above regions. By retrieving the identified variables, it is asserted that the value of variables can be referred to properly.

CITATION LIST

Patent Literature

Patent Literature 1: Japanese Patent No. 3269639
Patent Literature 2: Japanese Patent Application Publication No. 5-181687

SUMMARY OF INVENTION

Technical Problem

If the method in Patent Literature 2 is applied to the above multithreading of a loop, however, a region would be provided for each thread, and the variable used in the thread would be stored in the region.

This leads to the problem of an increase in the number of memory regions that are necessary, in proportion to the number of threads. For example, 16 threads require 16 corresponding memory regions.

In order to solve this problem, it is an object of the present invention to provide a multithreaded parallel execution device that can guarantee final values with a small number of memory regions.

Solution to Problem

A multithreaded parallel execution device according to the present invention comprises: an execution unit operable to divide repetitions of a loop process into a plurality of threads to execute the repetitions in parallel; a reception unit operable to receive a combination of a value and a sequential position for each thread while the execution unit is executing the repetitions in parallel, the value indicating a result of executing a repetition in the thread, and the sequential position being a position of the repetition within the loop process; a storage unit for storing the combination of the value and the sequential position; a control unit operable, when the reception unit receives the combination of the value and the sequential position, to selectively overwrite the combination of the value and the sequential position stored in the storage unit with the received combination of the value and the sequential position in accordance with whether the received sequential position is prior or subsequent to the sequential position stored in the storage unit; and a determining unit operable, when the execution unit finishes executing the repetitions in parallel, to determine the value stored in the storage unit to be a result of executing the loop process.

Advantageous Effects of Invention

With the multithreaded parallel execution device of the present invention, when the reception unit receives the combination of the value and the sequential position, overwriting of information in the storage unit with the received information depends on whether the received sequential position is prior or subsequent to the stored sequential position. Therefore, overwriting is appropriately controlled to guarantee final values.

Furthermore, by overwriting information in the storage unit with the value and the sequential position, even if the number of threads increases, the number of memory regions in the storage unit need not be increased.

BRIEF DESCRIPTION OF DRAWINGS

FIG. 3 is a decision table for whether to overwrite information.

FIG. 4 shows a sample program 1 and the result when executing sample program 1 sequentially.

FIGS. 6A and 6B are the first half of a figure illustrating the flow of information and whether the information in the temporary data storage unit 104 is overwritten when processing is performed in the order of iteration numbers 1→3→2→4.

FIGS. 7A-7C are the second half of a figure illustrating the flow of information and whether the information in the temporary data storage unit 104 is overwritten when processing is performed in the order of iteration numbers 1→3→2→4.

FIG. 11 is a decision table for whether to overwrite information.

DESCRIPTION OF EMBODIMENTS

The following describes embodiments of the present invention with reference to the drawings.

Embodiment 1

Figure 1:
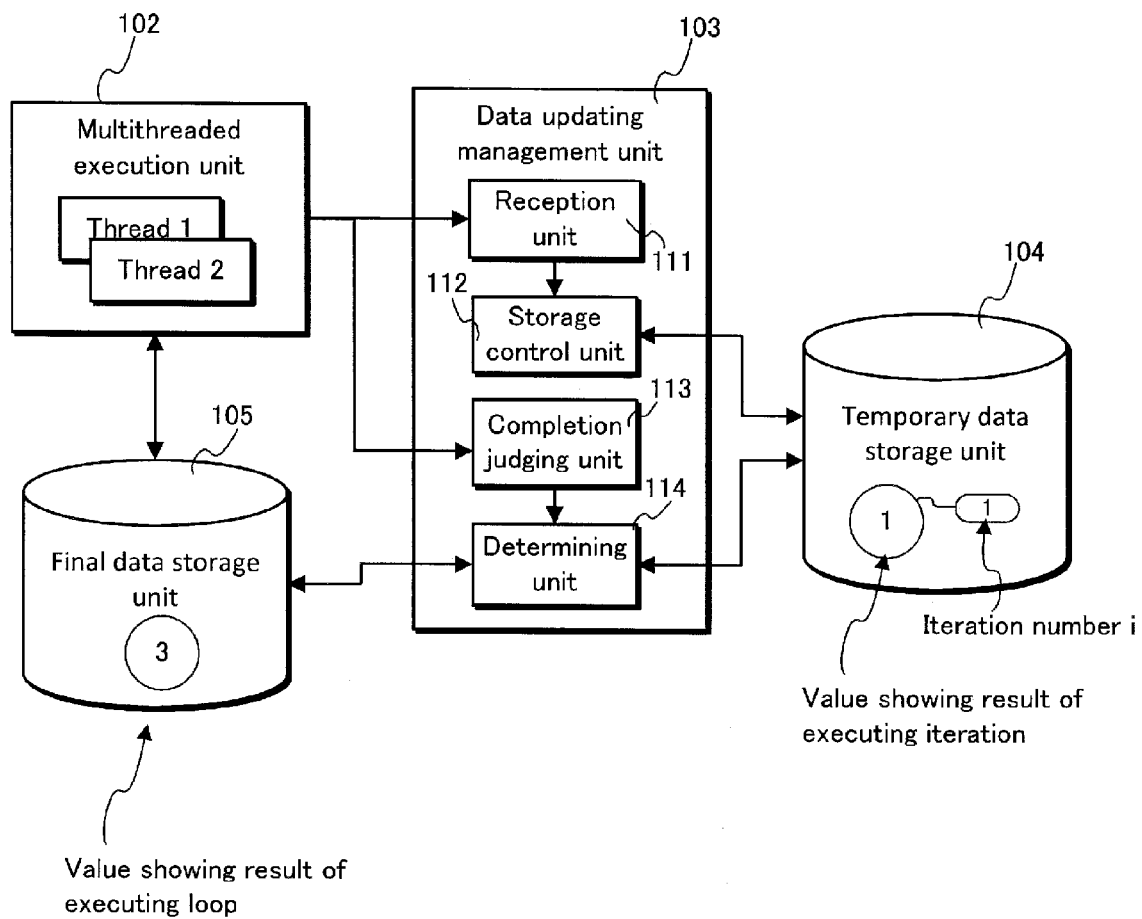
FIG. 1 is a functional block diagram of a multithreaded parallel execution device 101.

As shown in FIG. 1, a multithreaded parallel execution device 101 is provided with a multithreaded execution unit 102, a data updating management unit 103, a temporary data storage unit 104, and a final data storage unit 105.

The multithreaded execution unit 102 is formed by a CPU, for example, and executes programs.

The programs include command groups that correspond to repetitions (iterations) of a loop.

The multithreaded execution unit 102 divides the iterations into a plurality of threads and executes the threads in parallel.

During parallel execution, each time an iteration in a thread concludes, the multithreaded execution unit 102 transmits, to a reception unit 111, a set composed of a value indicating the result of executing the iteration and an iteration number i(th) indicating the number of the executed iteration within the loop (the order of iterations matching the order of execution were the loop to be executed sequentially).

Upon completion of parallel execution, the multithreaded execution unit 102 transmits information indicating completion to a completion judging unit 113.

The data updating management unit 103 manages data updating for the temporary data storage unit 104 and the final data storage unit 105 in response to parallel execution by the multithreaded execution unit 102.

The data updating management unit 103 is provided with the reception unit 111, a storage control unit 112, the completion judging unit 113, and a determining unit 114.

The reception unit 111 receives, from the multithreaded execution unit 102, information including a set composed of a value indicating the result of executing an iteration and the iteration number i(th) indicating the number of the executed iteration within the loop.

When the temporary data storage unit 104 has no data stored therein, the storage control unit 112 stores the set of the value and the iteration number i(th), received from the reception unit 111, in the temporary data storage unit 104. When corresponding information has already been stored in the temporary data storage unit 104, the storage control unit 112 either overwrites the stored information or not in accordance with conditions described below.

Upon receiving the above completion information from the multithreaded execution unit 102, the completion judging unit 113 judges whether parallel execution is complete. Upon judging that execution is complete, the completion judging unit 113 notifies the determining unit 114 accordingly.

Note that the determination of whether parallel execution is complete is not limited in this way and may be made using a general method.

Upon receiving, from the completion judging unit 113, notification of a judgment that parallel execution is complete, the determining unit 114 retrieves the value stored in the temporary data storage unit 104 and reflects (copies) the value in the final data storage unit 105.

The temporary data storage unit 104 is for storing the above value and iteration number i during parallel execution by the multithreaded execution unit 102.

Note that in the present description, the iteration number stored in the temporary data storage unit 104 is represented as "i", as opposed to the iteration number "i(th)" that the reception unit 111 receives from the multithreaded execution unit 102.

The final data storage unit 105 is for storing the value that results from executing the above loop.

Note that both storage units 104 and 105 are, for example, composed of Random Access Memory (RAM).

Next, operations of the data updating management unit 103 during multithreaded parallel execution are described with reference to FIG. 2.

First, the storage control unit 112 performs initialization, such as clearing the content of the temporary data storage unit 104 (S21).

Subsequently, until the completion judging unit 113 judges that parallel execution is complete (S22: Yes), the processing in steps S23 through S25 is repeated.

When the reception unit 111 receives the value and the iteration number i(th) (S23: Yes), the storage control unit 112 determines whether it is necessary to overwrite the value and the iteration number i in the temporary data storage unit 104 with the received value and iteration number i(th) (S24).

This determination is made in accordance with FIG. 3. The storage control unit 112 bases the determination on the relative sizes of the iteration number i(th) received by the reception unit 111 and the iteration number i stored in the temporary data storage unit 104.

Specifically, if the iteration number i is larger than the iteration number i(th) (i>i(th)), the storage control unit 112 determines that overwriting is not necessary (S24: No).

Conversely, if the iteration number i is equal to or less than the iteration number i(th) (i≤i(th)), the storage control unit determines that overwriting is necessary (S24: Yes). Note that overwriting is determined to be necessary even when no data is stored in the temporary data storage unit 104, such as immediately after the start of parallel execution.

The storage control unit 112 overwrites the content of the temporary data storage unit 104 with the received set of the value and the iteration number i(th) (S25).

As a result of this overwriting, the previous value in the order of iterations is deleted, and the latter value in the order of iterations is stored in the storage control unit 112.

When the completion judging unit 113 judges that parallel execution is complete (S22: Yes), the determining unit 114 retrieves the value from the temporary data storage unit 104 and copies the value into the final data storage unit 105.

Note that when the data in the temporary data storage unit 104 is invalid (such as when the multithreaded execution unit did not transfer any data at all, or when all of the transferred data was null), the determining unit 114 may be configured not to retrieve the value.

With the above flow, the value stored in the temporary data storage unit 104 by repeating steps S23 through S25 during parallel execution is the last in the order of the plurality of values each output as the result of execution of an iteration.

Accordingly, at the end of parallel execution, the same value as during sequential processing is copied into the final data storage unit 105, thus guaranteeing final values.

Furthermore, the data stored in the temporary data storage unit 104 is only a set of a value and the iteration number, thus reducing the number of memory regions as compared to providing a memory region for each thread.

Next, a specific example of parallel execution is described in detail.

FIG. 4 shows a sample program 1. The source code for the sample program 1 indicates execution of four iterations, a=0, 1, 2, and 3.

When the sample program 1 is executed sequentially, the results are as follows.

(1) when a=0, b[a]=b[0]=2>−2, therefore c=0+1=1
(2) when a=1, b[a]=b[1]=1>−2, therefore c=1+1=2
(3) when a=2, b[a]=b[2]=−1>−2, therefore c=2+1=3
(3) when a=3, b[a]=b[3]=−2≤−2, therefore c is not updated Therefore c=3, and the value "3" is the result of processing.

Suppose the four iterations in the sample program 1 are divided into two threads, thread 1 (responsible for a=0, 1) and thread 2 (responsible for a=2, 3).

Figure 5:
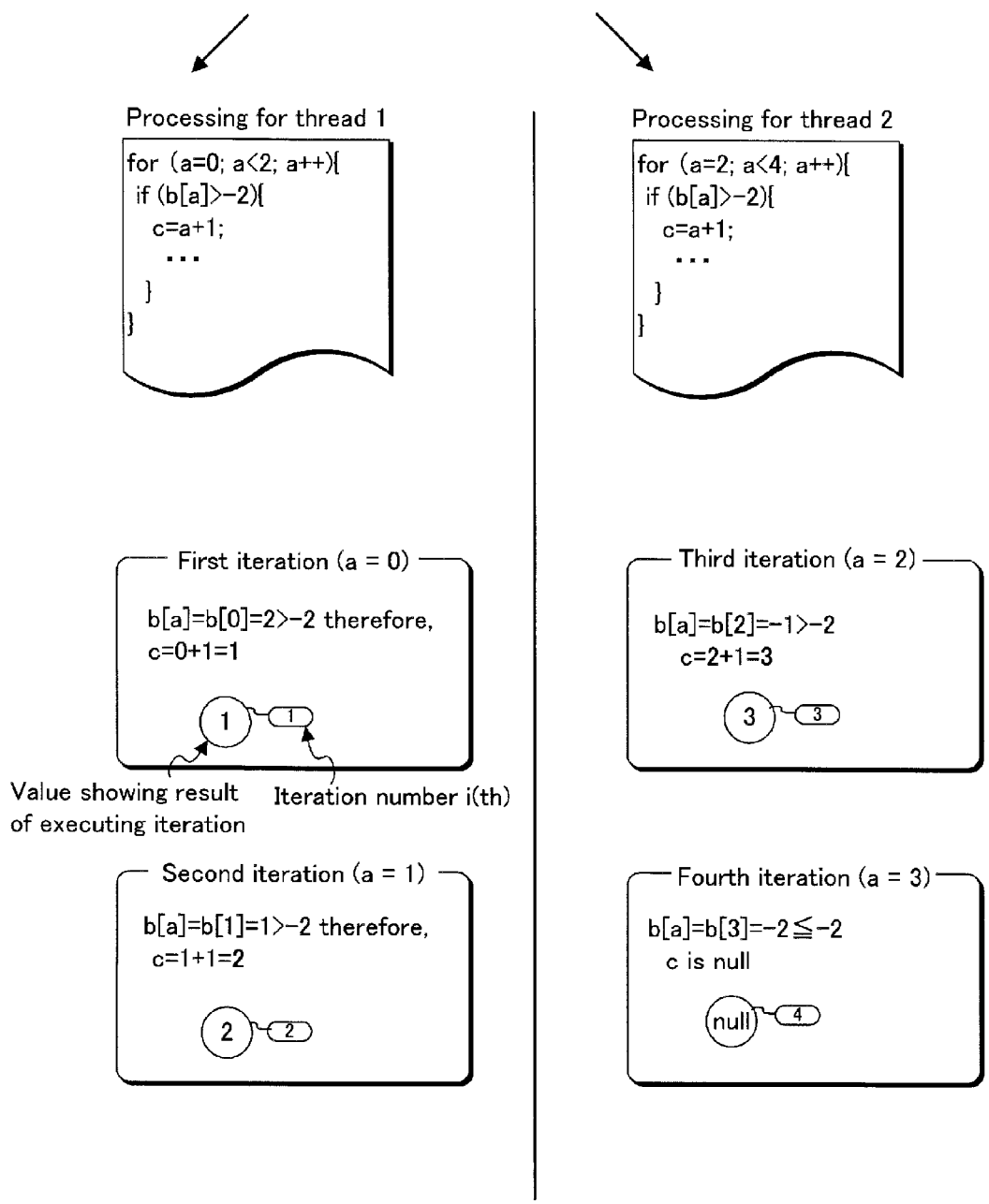
FIG. 5 shows the sample program of FIG. 4 and the result of each iteration when executing in parallel using threads 1 and 2.

As shown in FIG. 5, upon completing the first iteration (a=0), thread 1 transmits a set of a value 1 and an iteration number "1" to the reception unit 111 of the data updating management unit 103.

Each time threads 1 and 2 complete an iteration, the threads similarly transmit a set of the value resulting from processing and the iteration number to the reception unit 111 of the data updating management unit 103.

Consider the case when the four iterations in FIG. 5 are completed in the order of iteration numbers 1→3→2→4.

FIGS. 6A-6B and 7A-7C illustrate changes in the various types of data in this case.

As shown in FIG. 6A, when the first iteration concludes, the multithreaded execution unit transmits the value "1" resulting from execution of the iteration and the iteration number "1" to the data updating management unit 103.

Figure 2:
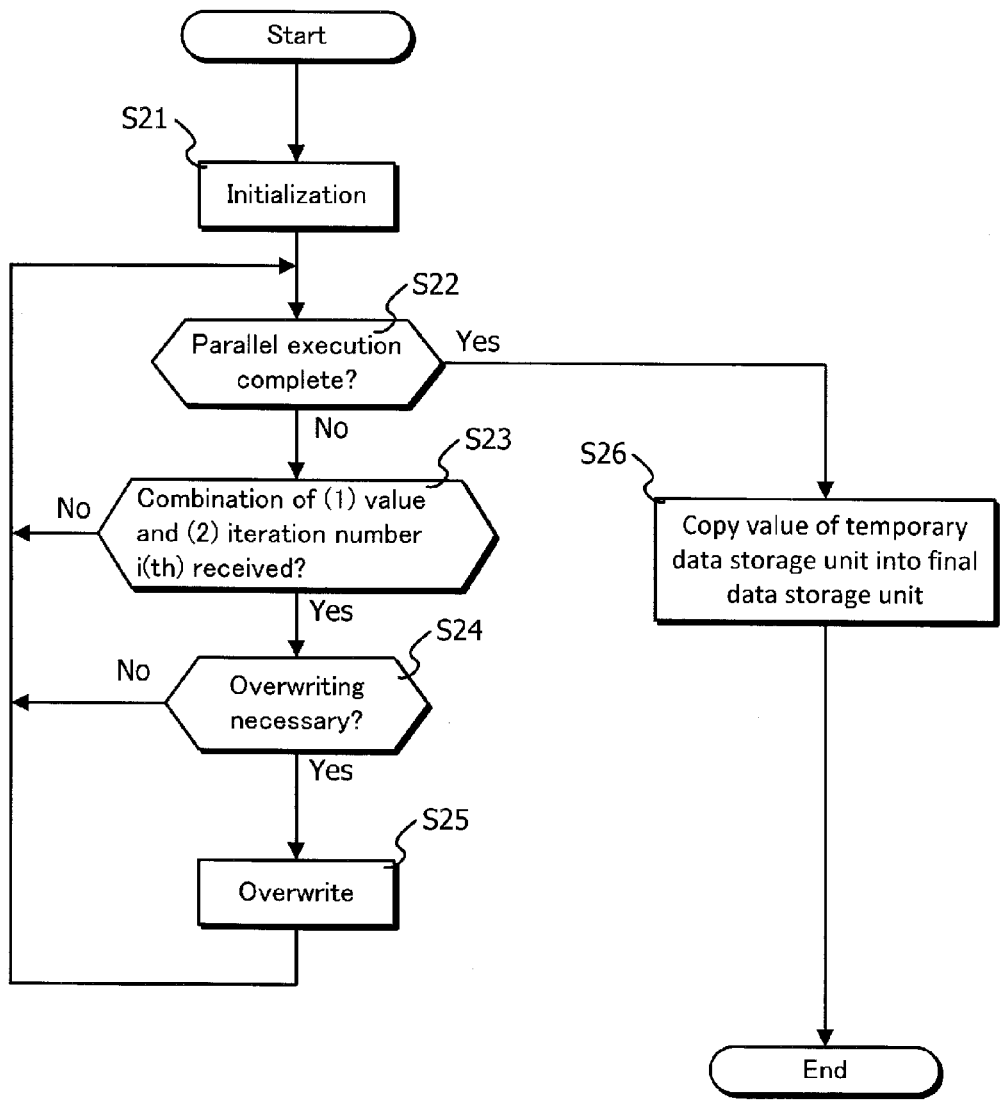
FIG. 2 is a flowchart of processing by a data updating management unit 103.

When the reception unit 111 of the data updating management unit 103 receives the value "1" and the iteration number "1", the storage control unit 112 of the data updating management unit 103 determines that overwriting is necessary, since no data is stored in the temporary data storage unit 104, and overwrites the content of the temporary data storage unit 104 (FIG. 2, S23: Yes, S24: Yes, S25).

As shown in FIG. 6B, upon completion of the third iteration, the storage control unit 112 of the data updating management unit 103 determines that overwriting is necessary, since the iteration number "1" stored in the temporary data storage unit 104 is equal to or less than the iteration number "3" received by the reception unit 111, and overwrites the content of the temporary data storage unit 104 (S23: Yes, S24: Yes, S25).

As shown in FIG. 7A, upon completion of the second iteration, the storage control unit 112 of the data updating management unit 103 determines that overwriting is not necessary, since the iteration number "3" stored in the temporary data storage unit 104 is greater than the iteration number "2" received by the reception unit 111 (S23: Yes, S24: No). The storage control unit 112 then discards the value "2" and the iteration number "2" received by the reception unit 111.

As shown in FIG. 7B, upon completion of the fourth iteration, the storage control unit 112 determines that overwriting is not necessary, since the value received by the reception unit 111 of the data updating management unit 103 is "null" (S23: Yes, S24: No). The storage control unit 112 then discards the value "null" and the iteration number "4" received by the reception unit 111.

As shown in FIG. 7C, when all of the iterations are complete, the multithreaded execution unit 102 transmits completion information indicating completion of parallel execution, and the completion judging unit 113 of the data updating management unit 103 receives the completion information (S22: Yes). The determining unit 114 then acquires the value "3" stored in the temporary data storage unit 104 and stores the value in the final data storage unit 105 (S26).

The value "3" stored in the final data storage unit 105 matches the value "3" of the result of sequential processing (see FIG. 4), thus showing that final values are guaranteed.

Embodiment 2

In Embodiment 2, final values are guaranteed even when setting a break point in repetitions of a loop in order to interrupt processing that is in progress.

When such a break point is set, the status of execution differs between sequential execution and parallel execution, thus requiring further innovation to guarantee final values. Details are described with reference to FIGS. 8A-8C.

Figure 8A:
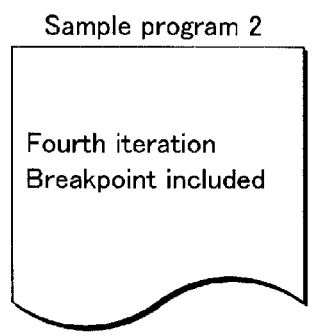
FIG. 8A shows a sample program 2 in which a break point is set.

In a sample program 2 shown in FIG. 8A, a loop having four iterations is described.

Figure 8B:
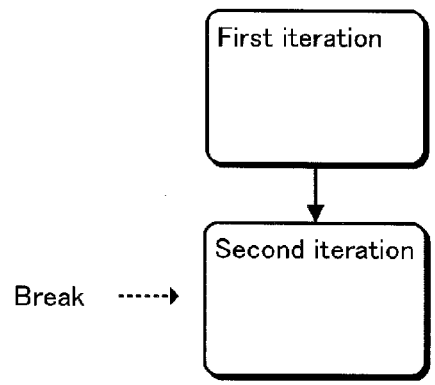
FIG. 8B shows a break occurring in the second iteration when sample program 2 is executed sequentially.

Consider the case of sequentially executing this program. In this case, when the break point is reached in the second iteration, the third and fourth iterations are not performed (FIG. 8B).

Figure 8C:
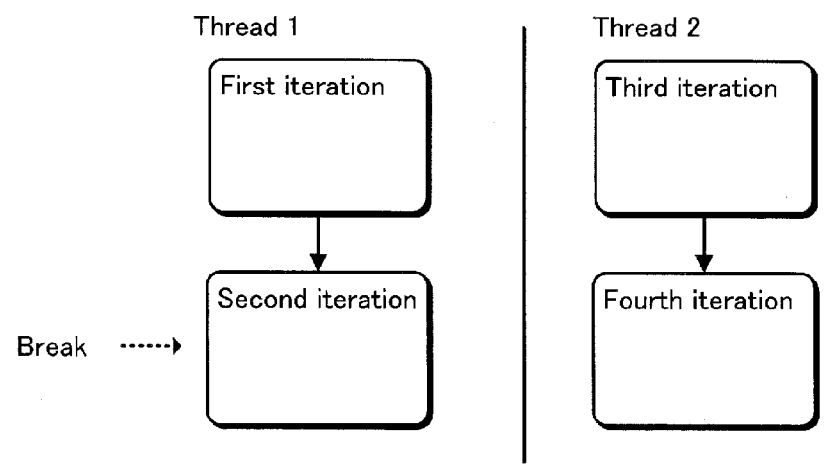
FIG. 8C shows parallel execution of sample program 2 using threads 1 and 2.

Suppose the four iterations in the sample program 2 are divided into two threads, thread 1 and thread 2, as shown in FIG. 8C.

As described above, when processing sequentially, the third and fourth iteration are not executed. Therefore, during parallel execution as well, it is necessary to avoid copying the result of the third and fourth iterations as the final value for the processing sequence.

To address this issue, Embodiment 2 guarantees final values by using a break flag to indicate whether a break point has been reached (the break flag being a flag that is ON if a break point has been reached and OFF otherwise).

Figure 9:
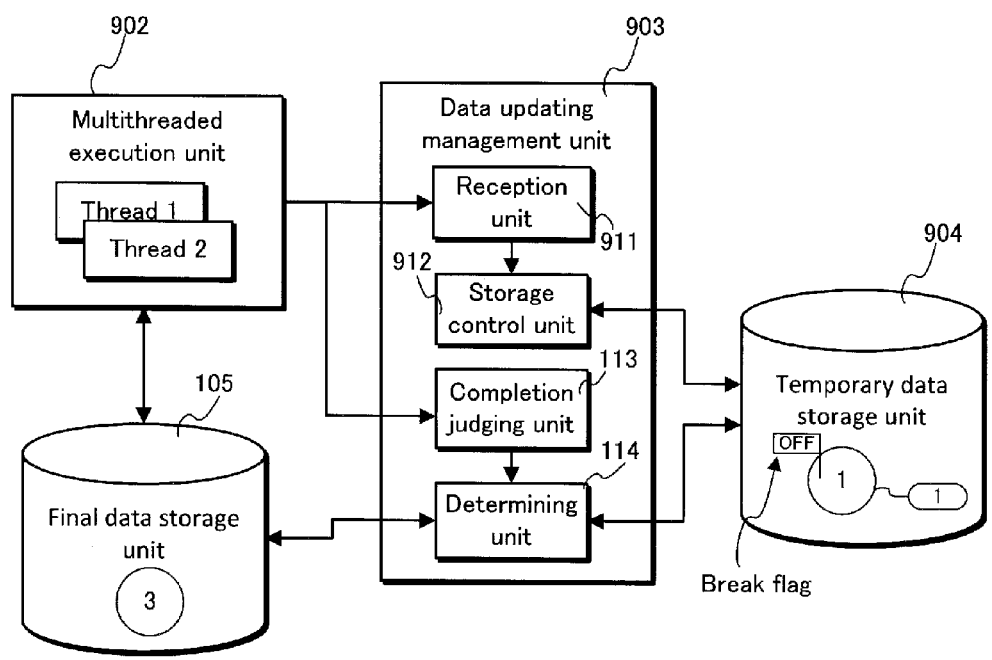
FIG. 9 is a functional block diagram of a multithreaded parallel execution device 901.

As shown in FIG. 9, a multithreaded parallel execution device 901 is provided with a multithreaded execution unit 902, a data updating management unit 903, and a temporary data storage unit 904.

During parallel execution, each time an iteration in a thread concludes, the multithreaded execution unit 902 transmits, to a reception unit 911, a set composed of a value indicating the result of executing the iteration, an iteration number i(th) indicating the number of the executed iteration within the loop, and a break flag indicating whether a break point has been reached. Other functions are similar to the multithreaded execution unit 102 (FIG. 1).

The storage control unit 912 of the data updating management unit 903 either overwrites stored information or not based on the set of the value, the iteration number i(th), and the break flag received by the reception unit 911.

The temporary data storage unit 904 is for storing the set of the value, the iteration number i, and the break flag during parallel execution by the multithreaded execution unit 902.

Since other function blocks in FIG. 9 are similar to the function blocks described with reference to FIG. 1, a description thereof is omitted.

Next, operations of the data updating management unit 903 during multithreaded parallel execution are described with reference to FIG. 10.

Figure 10:
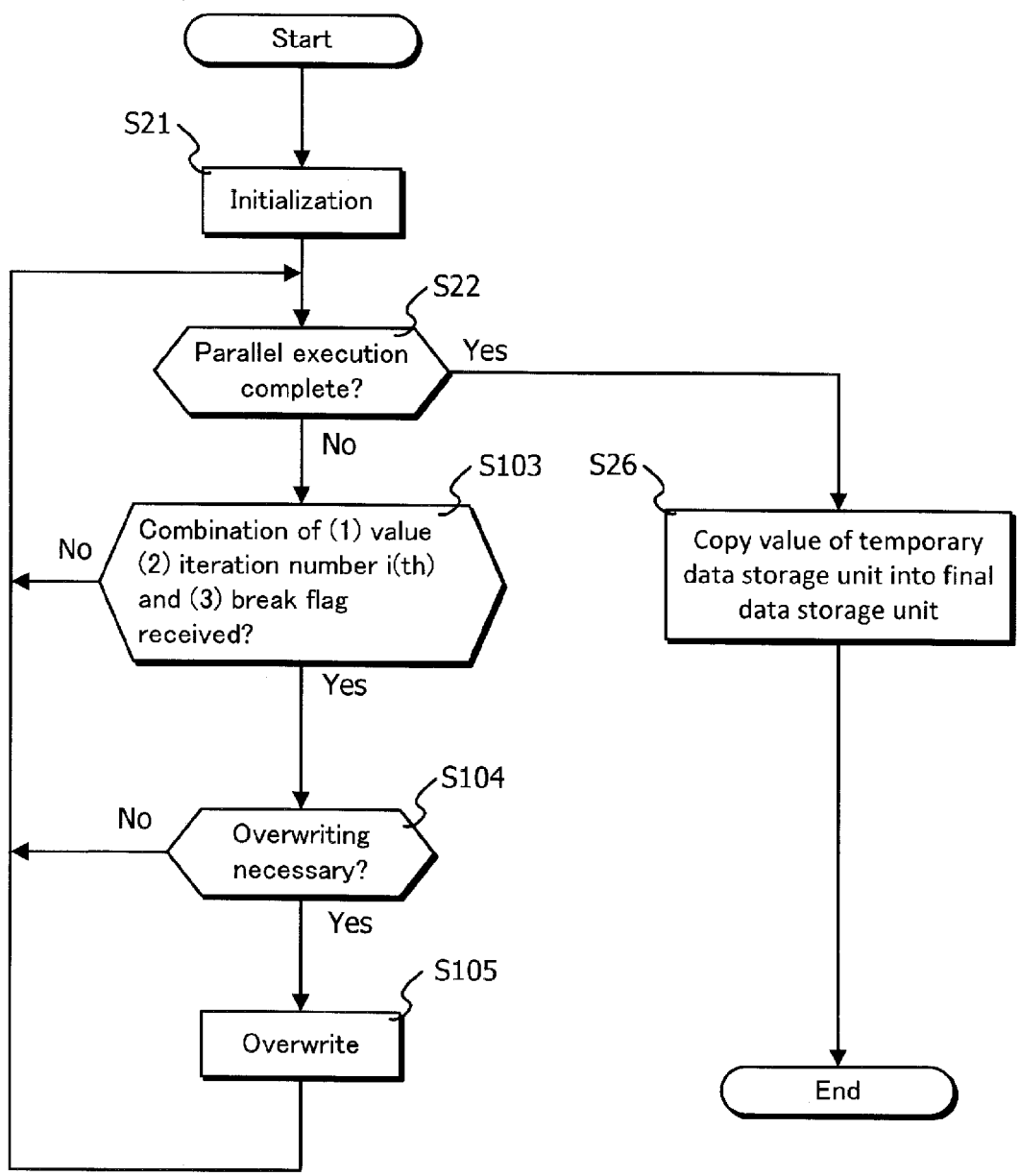
FIG. 10 is a flowchart of processing by a data updating management unit 903.

In FIG. 10, since steps S21-S22 and S26, which are assigned the same numbers as FIG. 2, are similar to FIG. 2, a description thereof is omitted.

In particular, when the reception unit 911 receives the value, the iteration number i(th), and the break flag (S103: Yes), the storage control unit 912 determines whether it is necessary to overwrite the value, the iteration number i, and the break flag in the temporary data storage unit 904 with the received value, iteration number i(th), and break flag (S104).

This determination is made in accordance with the table in FIG. 11.

As shown in the table in FIG. 11, the storage control unit 912 determines whether or not to overwrite information based on three factors: whether the break flag received by the reception unit 911 is ON or OFF, whether the break flag stored in the temporary data storage unit 904 is ON or OFF, and the relative sizes of the iteration numbers.

The following is a simple description of why the determination to overwrite differs for L1-L6 in FIG. 11.

As in Embodiment 1, the aim of lines L1-L2 is to store the latter value in the order of iteration numbers in the temporary data storage unit 904.

In line L3, information is not overwritten, since a value when a break occurred has been stored in the temporary data storage unit 904.

In line L4, information is overwritten since the value received by the reception unit 911 is the value when a break occurred.

Lines L5 and L6 cover the case when a break point is reached in two or more iterations among a plurality of iterations. At this point, it is necessary to maintain, in the temporary data storage unit 104, a value corresponding to the iteration that reaches a break point first (in the order supposing that processing were sequential).

Accordingly, in line L5, if the iteration number i(th) received by the reception unit 911 is prior to the iteration number i stored in the temporary data storage unit 904, information is overwritten. Line L6 is the opposite of line L5.

In accordance with the table in FIG. 11, when determining that overwriting is necessary (S104: Yes), the storage control unit 912 overwrites the information in the temporary data storage unit 904 with the received value, iteration number i(th), and break flag (S105).

Subsequently, until the completion judging unit 113 judges that parallel execution is complete (S22: Yes), the processing in steps S103, S104, and S105 is repeated.

When the completion judging unit 113 judges that parallel execution is complete (S22: Yes), the determining unit 114 copies the value of the temporary data storage unit 904 into the final data storage unit 105 (S26).

At this point, since the value stored in the temporary data storage unit 904 corresponds to the iteration first reaching a break point in the order supposing that processing were sequential, final values are guaranteed.

Embodiment 3

In Embodiment 3, the data updating management unit 103 of Embodiment 1 is constituted as a management thread in the multithreaded execution unit.

Figure 12:
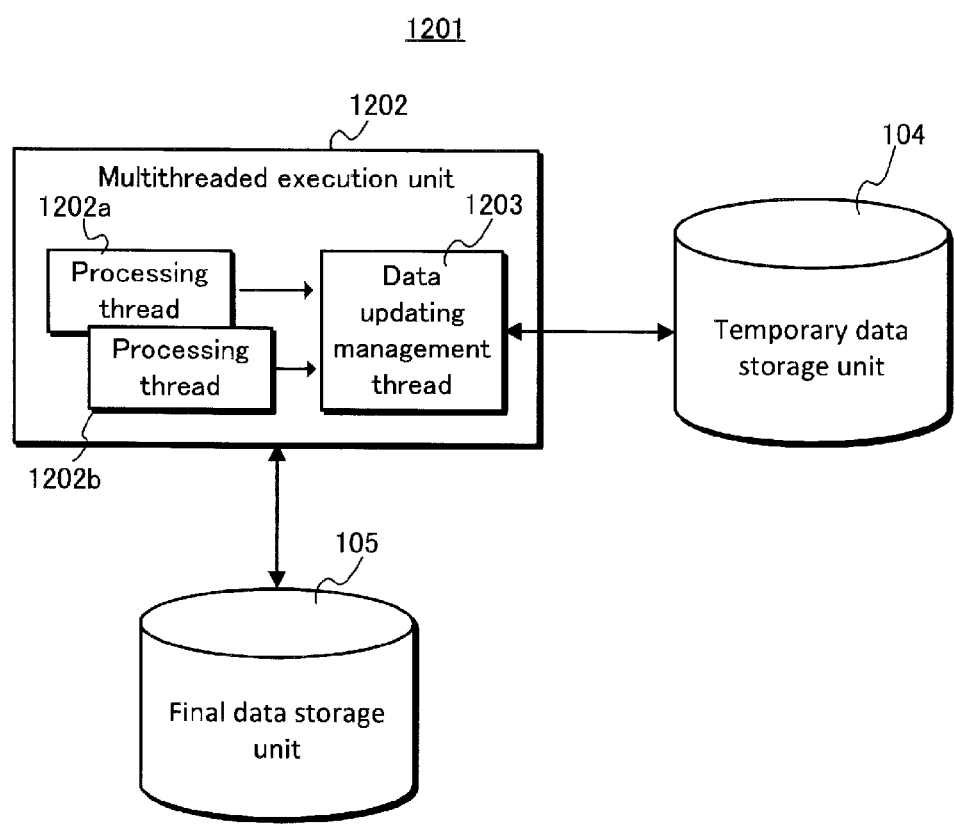
FIG. 12 is a functional block diagram of a multithreaded parallel execution device 1201.

As shown in FIG. 12, a multithreaded parallel execution device 1201 is provided with a multithreaded execution unit 1202. The multithreaded execution unit 1202 includes processing threads 1202a and 1202b, which divide up and process iterations of a loop, and a data updating management thread 1203.

The data updating management thread 1203 is provided with the same functions as the data updating management unit 103 (FIG. 1).

In other words, the data updating management thread 1203 has the following functions (1)-(4).

(1) A function to receive, from the processing threads 1202a and 1202b, a set composed of a value indicating the result of executing an iteration and an iteration number i(th) indicating the number of the executed iteration within the loop (this function corresponding to the reception unit 111 in FIG. 1).

(2) A function to control whether to overwrite information in the temporary data storage unit 104 (this function corresponding to the storage control unit 112 in FIG. 1).

(3) A function to determine that parallel execution has concluded upon receiving completion information indicating completion of parallel execution from the processing threads 1202a and 1202b (this function corresponding to the completion judging unit 113 in FIG. 1).

(4) A function to retrieve the value stored in the temporary data storage unit 104 and to copy the value into the final data storage unit 105 upon determining that parallel execution has concluded (this function corresponding to the determining unit 114 in FIG. 1).

Note that the data updating management thread 1203 may be provided with the function of the data updating management unit 903 (FIG. 9) described in Embodiment 2.

Embodiment 4

Embodiment 4 describes a multithreaded compiler that generates, from a source program, programs for processing threads and for a data updating management thread.

Figure 13:
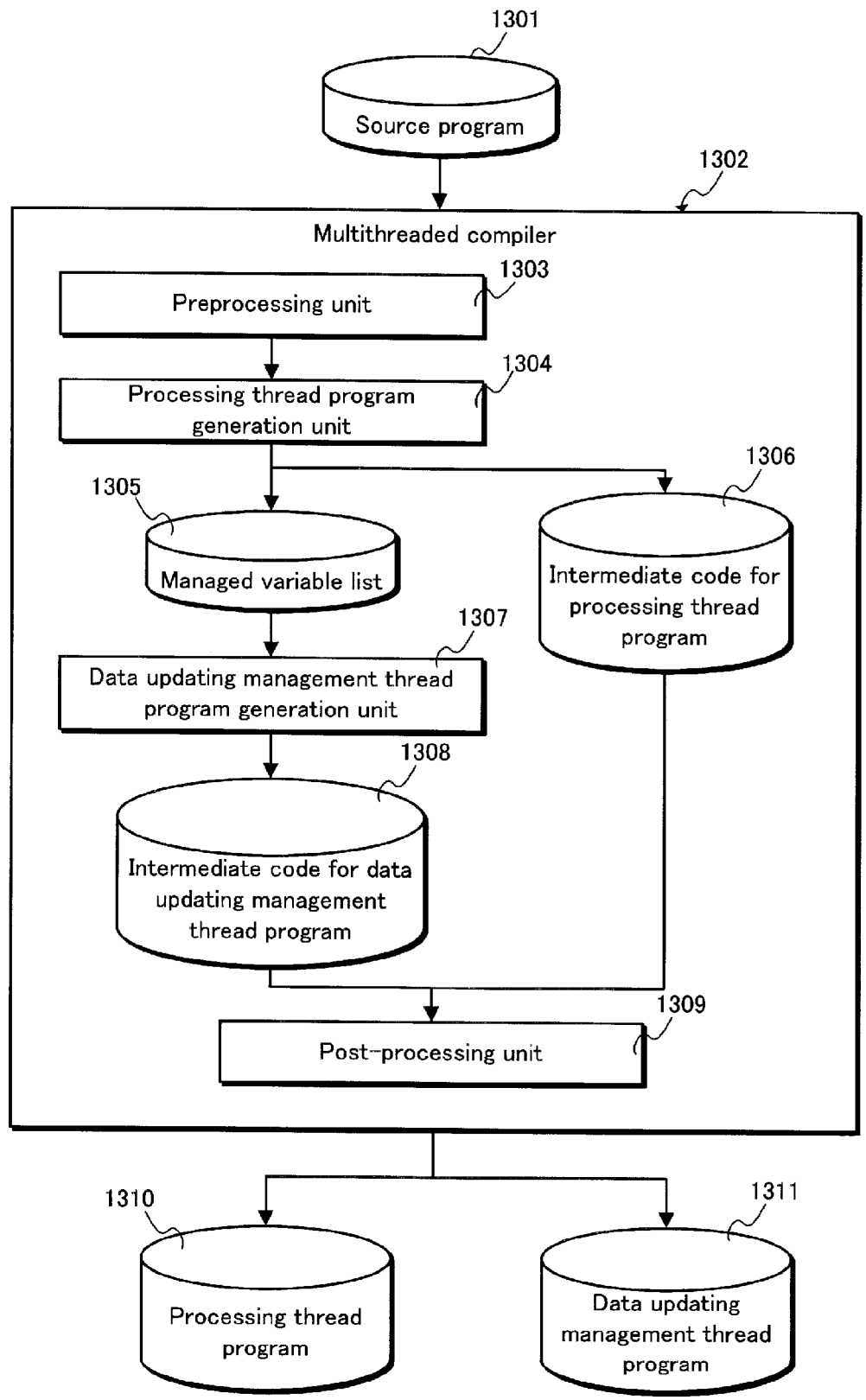
FIG. 13 is a configuration diagram of a multithreaded compiler 1302.

FIG. 13 is a configuration diagram of a multithreaded compiler 1302.

In FIG. 13, a multithreaded compiler 1302 receives a source program 1301 as input and generates a processing thread program 1310 and a data updating management thread program 1311.

A preprocessing unit 1303 performs preprocessing on the source program 1301, such as loop optimization.

From loops that can be processed in parallel and from a plurality of processing threads in the loops, a processing thread program generation unit 1304 derives variables that are assigned and generates a managed variable list 1305 of variables to be managed by the data updating management thread. The processing thread program generation unit 1304 also generates intermediate code 1306 for a processing thread program that includes a process for parallelization and a process to notify the data updating management thread.

A data updating management thread program generation unit 1307 generates an intermediate code 1308 for a data updating management thread program that performs the operations in the flowchart of FIG. 2 on each of the variables in the managed variable list 1305.

A post-processing unit 1309 performs post-processing, such as code conversion, on the intermediate code 1306 for the processing thread program and on the intermediate code 1308 for the data updating management thread program.

Figure 14:
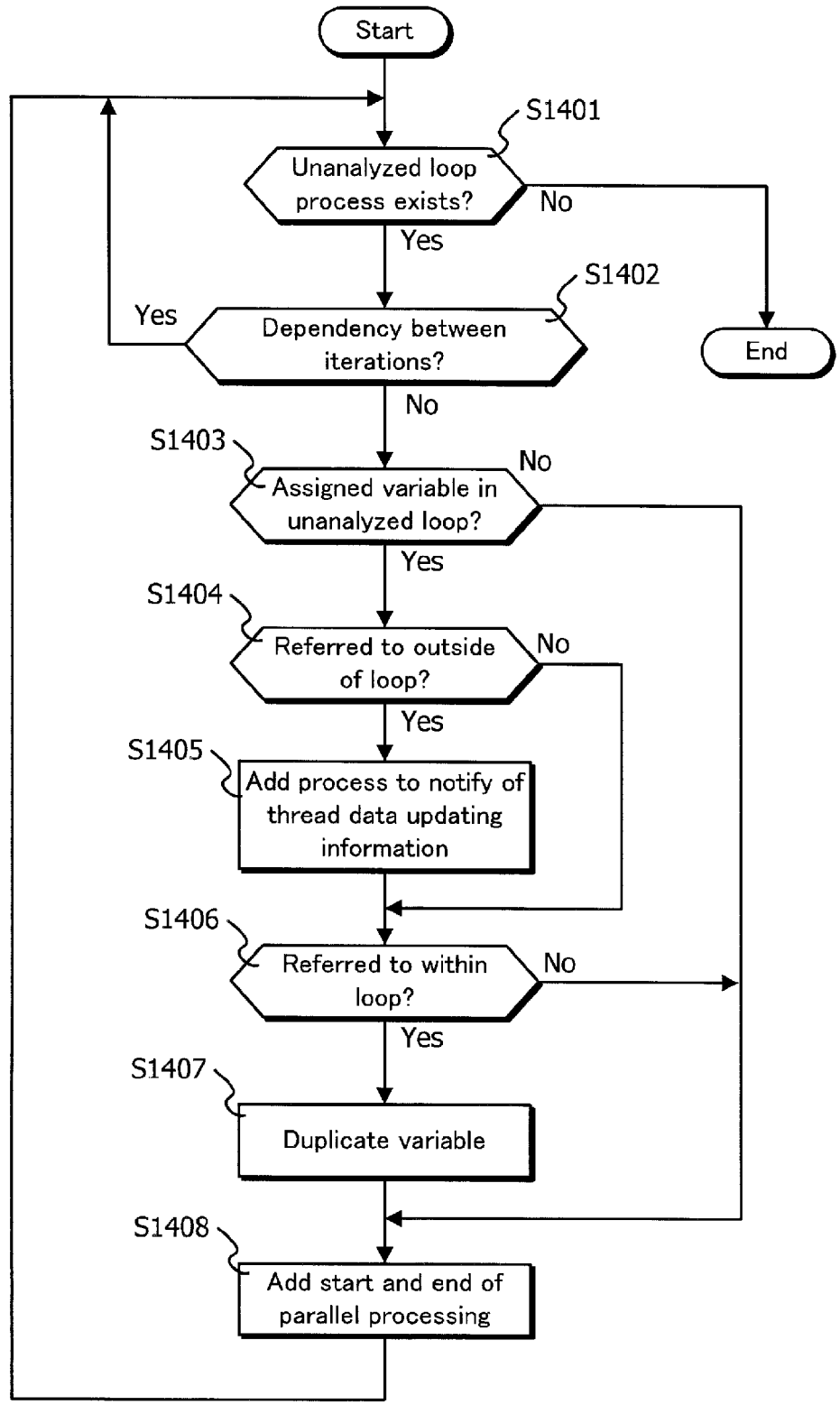
FIG. 14 is a flowchart of processing by a processing thread program generation unit 1304.

FIG. 14 is a flowchart for the processing thread program generation unit 1304.

In FIG. 14, the processing thread program generation unit first determines whether an unanalyzed loop process exists (S1401).

When there is no unanalyzed loop process (S1401: No), processing terminates.

When there is an unanalyzed loop (S1401: Yes), it is determined whether there is dependency between iterations of the loop (S1402).

When there is dependency between iterations (S1402: Yes), processing returns to determining whether an unanalyzed loop exists (S1401).

When there is no dependency between iterations of the loop (S1402: No), it is determined whether there is an assigned variable within the unanalyzed loop (S1403).

When there is no assigned variable in the unanalyzed loop (S1403: No), processing proceeds to appending a start and end of parallel processing (S1408).

When there is an assigned variable within the unanalyzed loop (S1403: Yes), the following processes are performed.

If the variable is referred to outside of the loop (S1404: Yes), then a process to notify the data updating management thread of thread data updating information is added (S1405).

This "thread data updating information" is information on updating of data used by each processing thread. For example, this information includes a set of a value indicating the result of executing an iteration and the iteration number i(th).

If the variable is referred to within the loop (S1406: Yes), the variable is duplicated exclusively for use within the processing thread (S1407).

Next, a start and end of parallel processing are attached (S1408), and processing returns to determining whether an unanalyzed loop process exists (S1401).

With this structure, the data updating management thread receives thread data updating information from each processing thread, determines whether or not to update the data updating information, and discards data not necessary for guaranteeing final values, storing only one necessary piece of data. Since a region for storing the data updating information is not necessary for each processing thread, this structure guarantees final values during multithreaded parallel execution with a small number of memory regions.

Furthermore, since the data updating management thread is executed on a multithreaded execution means, the present structure can be implemented using a known multithreaded execution means. Furthermore, a multithreaded compiler can automatically generate, from a program that operates over one thread, a program that operates on a multithreaded execution means and that guarantees final values.

Note that the processing thread program 1310 generated by the multithreaded compiler 1302 may be one program or a plurality of programs.

The processing thread program 1310 and the data updating management thread program 1311 may be programs in the same language as the source program, or may be object code operating on a multithreaded operating means.

Furthermore, in Embodiment 4, the managed variable list 1305, the intermediate code 1306 for the processing thread program, and the intermediate code 1308 for the data updating management thread program may be generated as files or may simply be stored as information within the compiler.

In Embodiment 4, the preprocessing unit 1303 is shown separate from other processing units, but a structure without the preprocessing unit 1303 is possible. Alternatively, the preprocessing unit 1303 may be included in another processing unit.

In Embodiment 4, the post-processing unit 1309 is shown separate from other processing units, but a structure without the post-processing unit 1309 is possible. Alternatively, the post-processing unit 1309 may be included in another processing unit.

Embodiment 5

Embodiment 5 is an integrated circuit (LSI) implementation of the multithreaded parallel execution device described in Embodiment 1 and other embodiments. This integrated circuit can be installed in a variety of AV equipment, such as a digital television, a Blu-Ray disc recorder, or the like.

Figure 15:
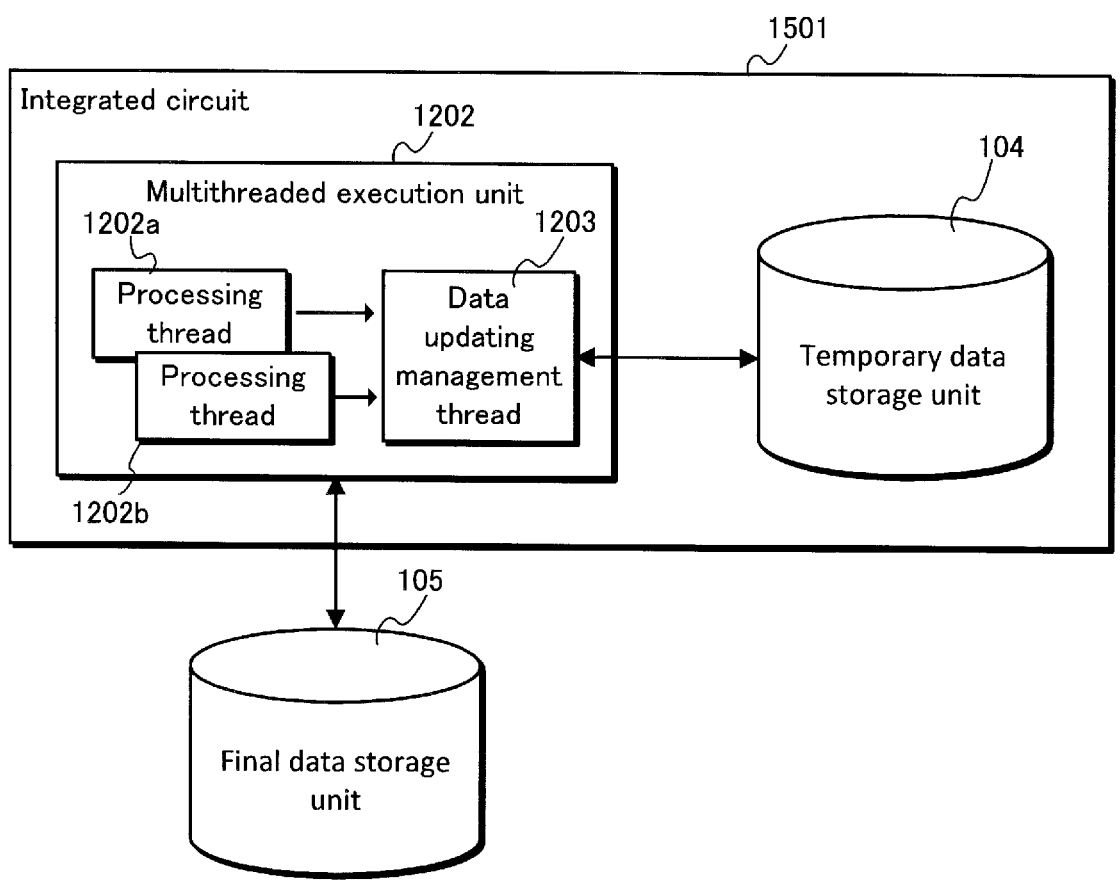
FIG. 15 is a functional block diagram of an integrated circuit 1501.

As shown in FIG. 15, an integrated circuit 1501 is provided with a multithreaded execution unit 1202 and a temporary data storage unit 104.

The integrated circuit is, for example, an LSI. The integrated circuit may be divided into discrete chips, or part or all of the integrated circuit may be included in one chip. Although referred to here as an LSI, depending on the degree of integration, the terms IC, system LSI, super LSI, or ultra LSI are also used. In addition, the method for assembling integrated circuits is not limited to LSI, and a dedicated communication circuit or a general-purpose processor may be used. A Field Programmable Gate Array (FPGA), which is programmable after the LSI is manufactured, or a reconfigurable processor, which allows reconfiguration of the connection and setting of circuit cells inside the LSI, may be used. Furthermore, if technology for forming integrated circuits that replaces LSIs emerges, owing to advances in semiconductor technology or to another derivative technology, the integration of functional blocks may naturally be accomplished using such technology.

Embodiment 6

The multithreaded parallel execution device described in Embodiment 1 may be incorporated into a variety of devices and preferably used to perform decoding or re-encoding.

Figure 16:
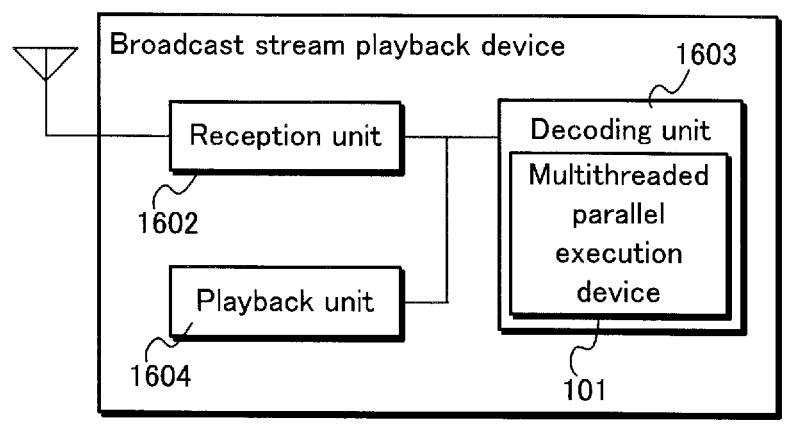
FIG. 16 is a functional block diagram of a broadcast stream playback device 1601.

A broadcast stream playback device 1601 shown in FIG. 16 is provided with a reception unit 1602 that receives a broadcast stream, a decoding unit 1603 that decodes the received broadcast stream, and a playback unit 1604 that plays back the decoded broadcast stream. The decoding unit 1603 includes the multithreaded parallel execution device 101.

Figure 17:
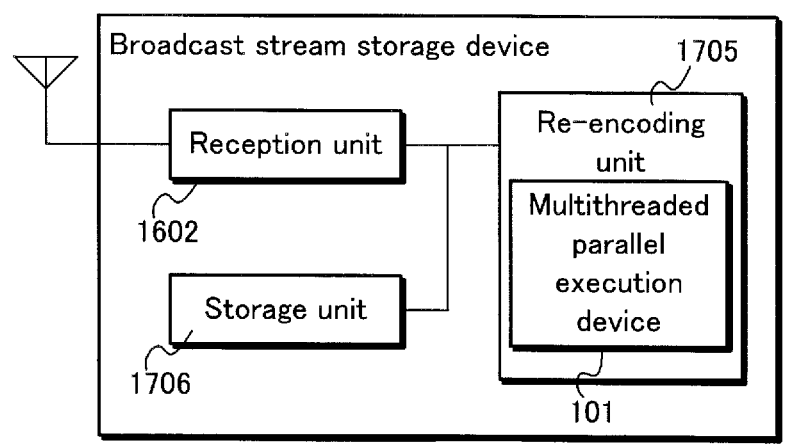
FIG. 17 is a functional block diagram of a broadcast stream storage device 1701.

A broadcast stream storage device 1701 shown in FIG. 17 is provided with the reception unit 1602 that receives a broadcast stream, a re-encoding unit 1705 that re-encodes the received broadcast stream, and a storage unit 1706 that stores the re-encoded broadcast stream. The re-encoding unit 1705 includes the multithreaded parallel execution device 101.

Figure 18:
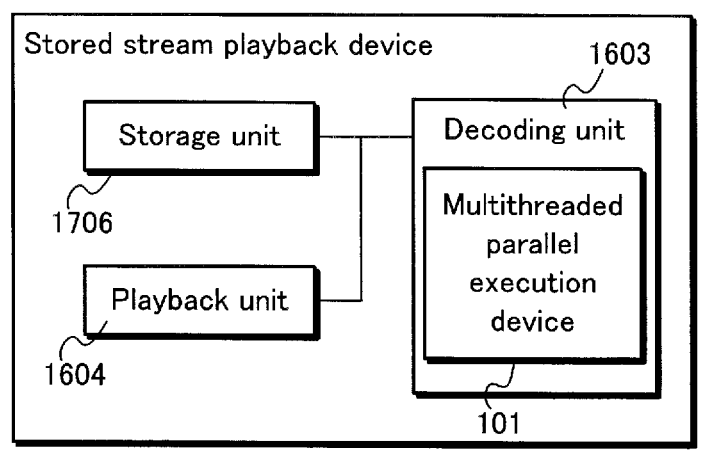
FIG. 18 is a functional block diagram of a stored stream playback device 1801.

A stored stream playback device 1801 shown in FIG. 18 is provided with a storage unit 1706 that stores a stream, a decoding unit 1603 that decodes the stored stream, and a playback unit 1604 that plays back the decoded stream. The decoding unit 1603 includes the multithreaded parallel execution device 101.

Figure 19:
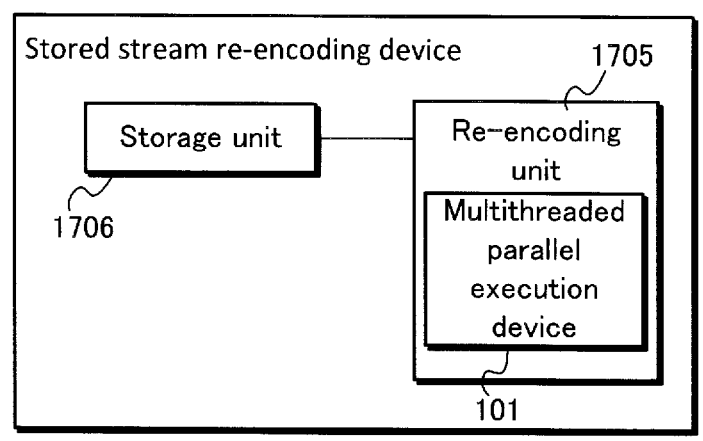
FIG. 19 is a functional block diagram of a stored stream re-encoding device 1901.

A stored stream re-encoding device 1901 shown in FIG. 19 is provided with the storage unit 1706 that stores a stream and re-encoding unit 1705 that re-encodes the stored stream. The re-encoding unit 1705 includes the multithreaded parallel execution device 101.

Note that Embodiment 6 may be appropriately combined with other embodiments. For example, the integrated circuit 1501 described in Embodiment 5 may be incorporated into the broadcast stream playback device 1601.

Embodiment 7

In Embodiment 1, the information stored by the temporary data storage unit 104 is one set of a value indicating the result of executing an iteration and an iteration number i, but alternatively a plurality of such sets may be stored.

By thus storing a plurality of sets, final values are guaranteed even when executing various types of iterations in parallel.

Figure 22:
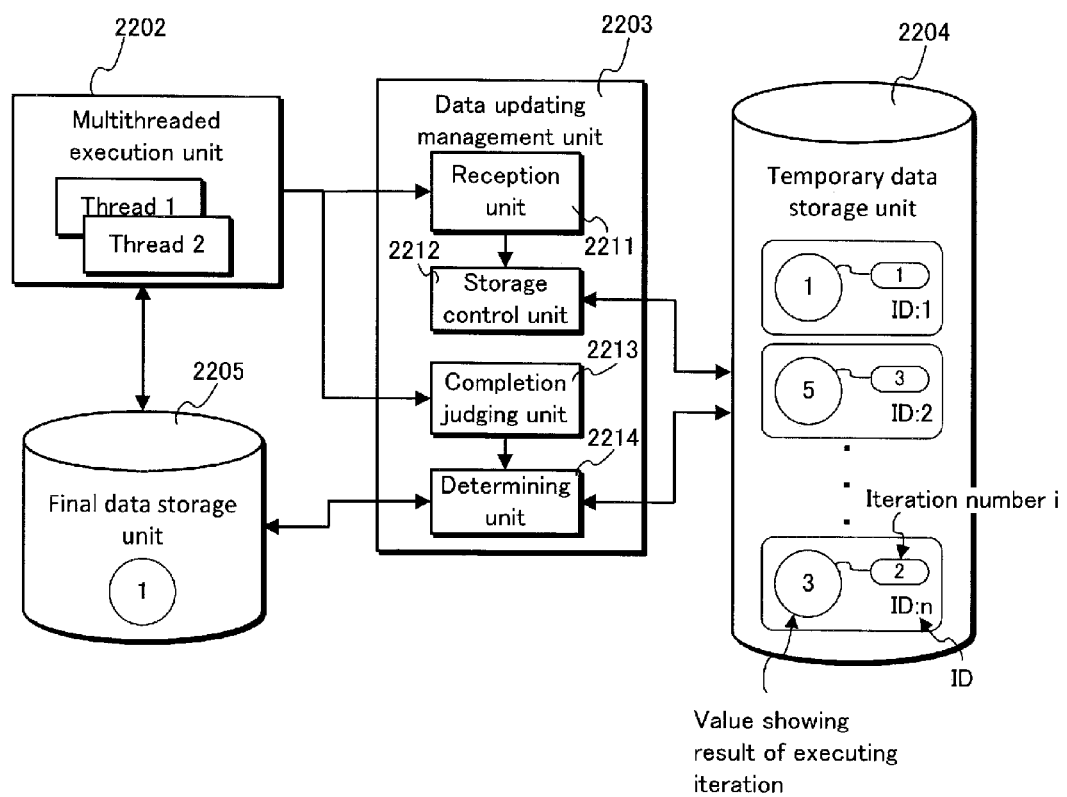
FIG. 22 is a functional block diagram of a multithreaded parallel execution device 2201.

An example is described with reference to FIG. 22. A multithreaded parallel execution device 2201 is provided with a multithreaded execution unit 2202, a data updating management unit 2203, and a temporary data storage unit 2204.

The temporary data storage unit 2204 stores n sets (n being an integer at least 2) composed of (1) a value indicating the result of executing an iteration, (2) an iteration number i, and (3) an ID for identifying the type of iteration.

The multithreaded execution unit 2202 has a function to execute a variety of types of iterations in parallel. Each time an iteration in a thread concludes, the multithreaded execution unit 2202 transmits a value indicating the result of executing the iteration, the iteration number i, and the ID to a reception unit 2211.

Furthermore, when all iterations of a certain one of the types are complete, the multithreaded execution unit 2202 transmits, to the completion judging unit 2213, completion information including an ID identifying the type of the iterations that are complete.

When the reception unit 2211 receives the set of the value, the iteration number i, and the ID, the storage control unit 2212 either overwrites stored information or not with the value and the iteration number i corresponding to the ID, determining whether to overwrite based on the relative sizes of the received iteration number i and the iteration number i stored in the temporary data storage unit 2204 in correspondence with the received ID.

When overwriting information stored in the temporary data storage unit 2204, the storage control unit 2212 overwrites the value and the iteration number corresponding to the ID.

When the completion judging unit 2213 receives the completion information from the multithreaded execution unit 2202, the determining unit 2214 acquires the value, among the sets of information stored in the temporary data storage unit 2204, corresponding to the ID included in the completion information and stores the acquired value in the final data storage unit 2205.

Note that in order to identify the type of iteration that yielded the processing result, the value in the final data storage unit 2205 may be stored in association with an ID.

While this concludes the description of Embodiment 7, a modification thereof may incorporate the break point described in Embodiment 2. Specifically, the multithreaded execution unit 2202 would transmit four types of information to the reception unit 2211 each time an iteration of each thread concludes:

(1) a value indicating the result of executing the iteration,
(2) an iteration number i(th) indicating the number of the executed iteration within the loop,
(3) an ID to identify the type of the iteration, and
(4) a break flag indicating whether a break point was reached.

The storage control unit 2212 determines whether to overwrite information based on the relative sizes of the received iteration number i and the iteration number i stored in the temporary data storage unit 2204 in correspondence with the received ID, on whether the received break point is ON or OFF, and on whether the break point stored in the temporary data storage unit 2204 in correspondence with the received ID is ON or OFF. This determination method is similar to the method described with reference to FIG. 11, and thus further description is omitted.

Embodiment 8

Commands issued by the multithreaded execution unit described in the above embodiments may include the commands described in (1)-(3) below. These commands can contribute to flexible parallel execution. Since the basic structure is the same as that described with reference to FIG. 1, the function blocks in FIG. 1 are used in the following description of the present embodiment.

(1) Command to Invalidate Information in the Temporary Data Storage Unit 104

Upon receiving this command from the multithreaded execution unit 102 via the reception unit 111, the storage control unit 112 invalidates (or clears) information in the temporary data storage unit 104. The present command may be used for initialization of multithreaded parallel execution (FIG. 2, S21), for example.

(2) Command to Transmit Thread Data Updating Information to Management Hardware

This is a command to transmit thread data updating information (information on updating of data used by each processing thread) to management hardware.

(3) Command to Copy Information from the Temporary Data Storage Unit 104 into an Actual Variable This is a command to copy information from the temporary data storage unit 104 into an actual variable stored in the final data storage unit 105. This command may be used during processing to copy values (FIG. 2, S26), for example.

Embodiment 9

Embodiment 9 is a combination of Embodiments 7 and 8. The function blocks in FIG. 22 are used in the following description.

In Embodiment 9, as in Embodiment 7, the temporary data storage unit 2204 stores n sets (n being an integer at least 2) composed of (1) a value indicating the result of executing an iteration, (2) an iteration number i, and (3) an ID.

The thread data updating information in the multithreaded execution unit 2202 includes an ID for identifying one of the n sets.

The multithreaded execution unit 2202 may issue commands such as the following. Commands (1)-(3) include at least one ID to identify the target of execution of the command.

(1) Commands to Allocate or Invalidate a Region in the Temporary Data Storage Unit 2204

These are commands to allocate or invalidate a region in the temporary data storage unit 2204 corresponding to an ID. These commands may be used for initialization of multithreaded parallel execution (FIG. 2, S21).

When allocation (invalidation) was not possible, an exception may be thrown, or a status register managing the occupancy state of each region may be updated.

(2) Command to Transmit Thread Data Updating Information to Management Hardware

This is a command to transmit thread data updating information, corresponding to a designated ID, to management hardware.

(3) Command to Copy Information from the Temporary Data Storage Unit 2204 into an Actual Variable This is a command to copy information from the temporary data storage unit 2204, corresponding to a designated ID, into an actual variable stored in the final data storage unit 2205. This command may be used during processing to copy values (FIG. 2, S26), for example.

(4) Command to Free a Region in the Temporary Data Storage Unit 2204

This is a command to free a region, corresponding to one or more IDs, in the temporary data storage unit 2204. This command may be used to free regions that are no longer necessary after performing processing to copy values (FIG. 2, S26), for example.

Note that the processing in (3) and (4) may be combined into one command.

Supplementary Explanation 1

While embodiments of the present invention have been described, the present invention is not limited to the description of the above embodiments, but rather may be implemented by a variety of modifications in order to achieve the object of the present invention or a related or associated object thereof. For example, the following modifications are possible.

(1) In the embodiments, as shown in FIG. 5, for an iteration that does not update a value, the multithreaded execution unit 102 has been described as transmitting "null" to indicate no data, but processing is not limited in this way. For example, for an iteration that does not update a value, the multithreaded execution unit 102 need not transmit a value or an iteration number.

(2) In the embodiments, the temporary data storage unit 104 and the final data storage unit 105 have been described as separate storage units, as in FIG. 1, but these may be the same data storage unit.

(3) In the embodiments, an example of repeating a for if statement, as in FIG. 4, has been described, but the present invention is not limited in this way. For example, a for statement, a while statement, a do while statement, and the like in C may be used.

(4) In the embodiments, each time an iteration concludes, the multithreaded execution unit 102 transmits a value for the result of executing the iteration and an iteration number, but alternatively, this information may be transmitted at the conclusion of the thread.

Figure 20A:
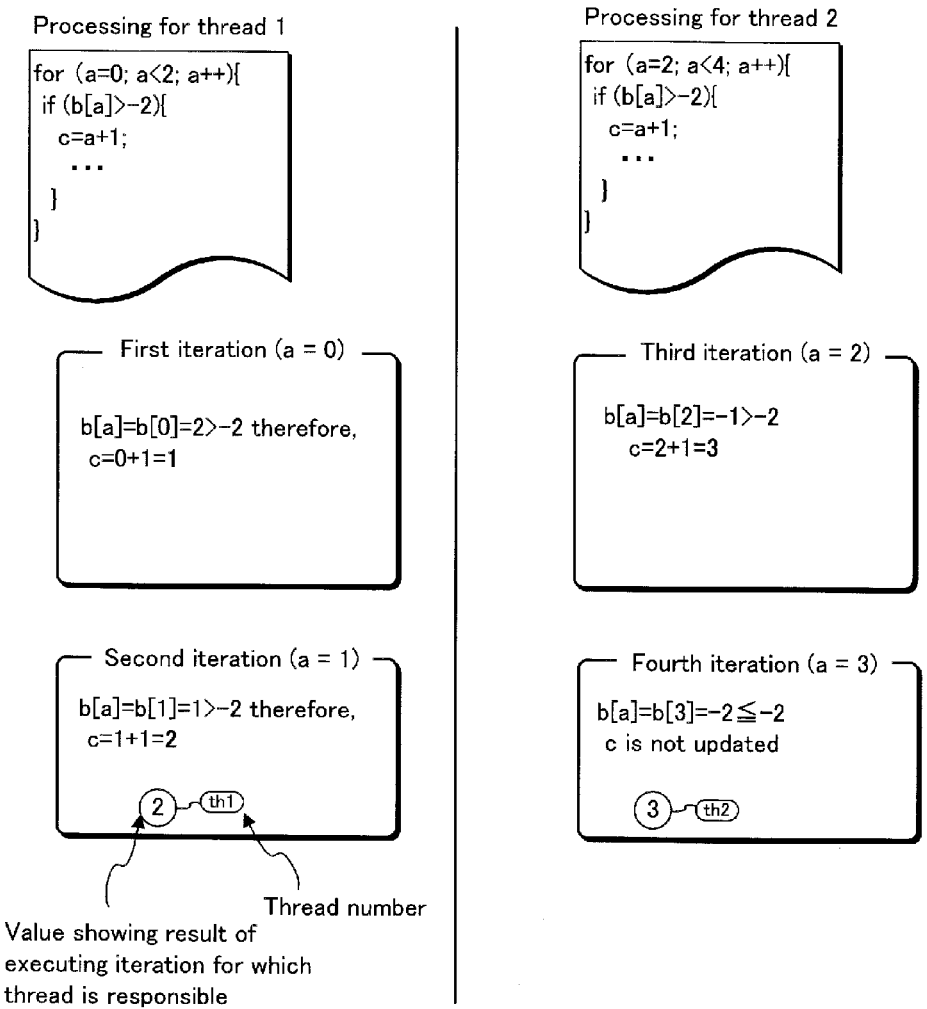
FIGS. 20A and 20B show a modification.

For example, as shown in FIG. 20A, when the processing in thread 1 is complete, the multithreaded execution unit 102 transmits the value "2", indicating the result of executing iterations for which thread 1 was responsible, along with the thread number "th1".

Similarly, when the processing in thread 2 is complete, the multithreaded execution unit 102 transmits the value "3", indicating the result of executing iterations for which thread 2 was responsible, along with the thread number "th2".

The storage control unit 112 of the data updating management unit 103 determines whether to overwrite information based on the relative size of the thread numbers.

Figure 20B:
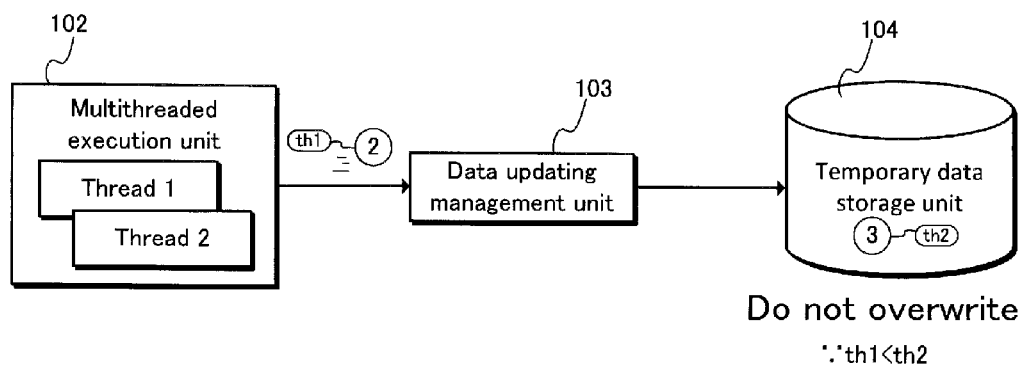

In the example in FIG. 20B, the thread number stored in the temporary data storage unit, "th2", is after the received thread number, "th1", and therefore the value is not overwritten.

(5) In the embodiments, initialization has been only briefly described, as shown in FIG. 2. However, operations may be performed as follows, for example, in accordance with whether data is updated.

Figure 21:
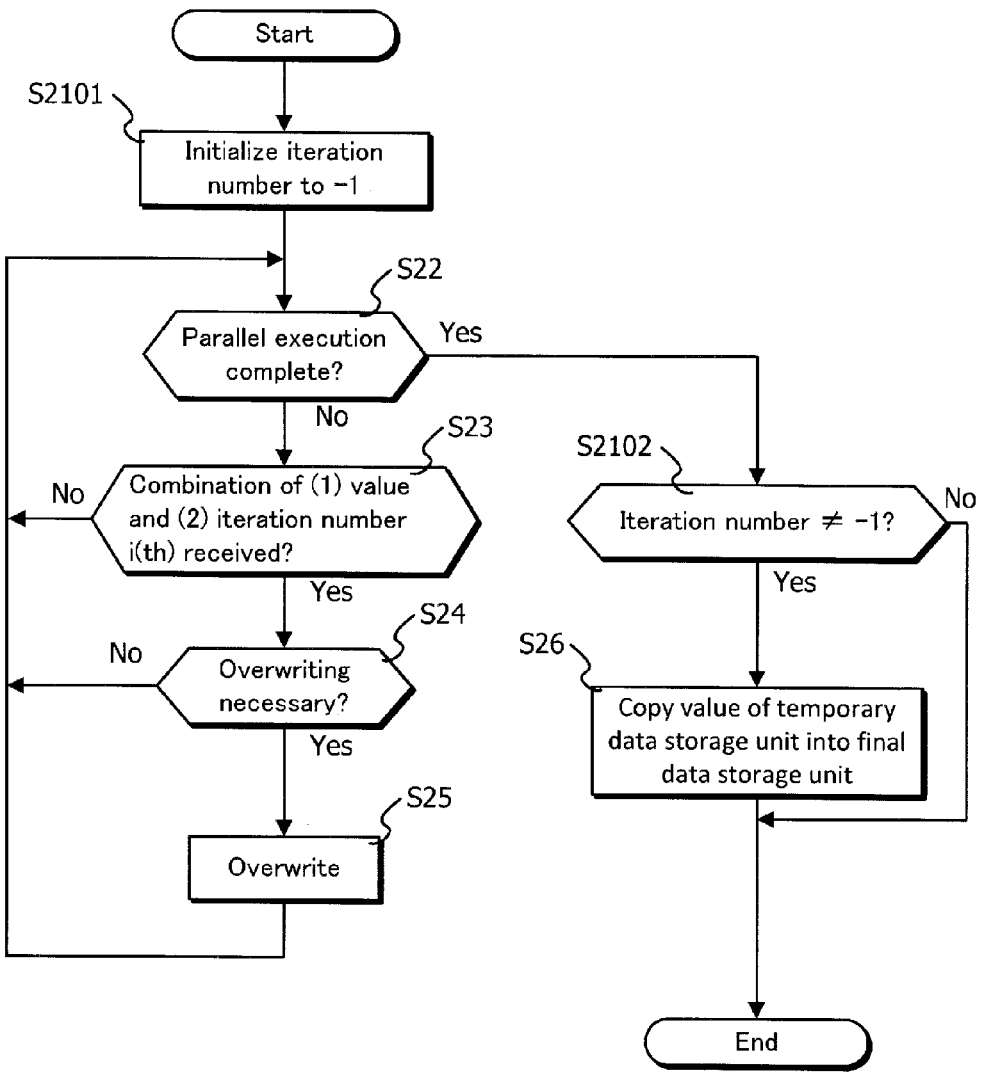
FIG. 21 is a flowchart of processing by the data updating management unit 103.

As shown in FIG. 21, the storage control unit 112 performs initialization by setting the iteration number to "—1" (S2101).

After parallel execution is complete (S22: Yes), if the iteration number is still "−1" (S2102: No), the value of temporary data storage unit 104 was not updated at all during parallel execution, and therefore the storage control unit 112 skips copying of data (S26).

(6) In the embodiments, for example in FIG. 7C, at the conclusion of parallel execution, the value "3" stored in the temporary data storage unit 104 is copied into the final data storage unit 105, but the present invention is not limited in this way.

What is important is determining the value "3" as the result of parallel execution. For example, information may be attached to the value "3" to indicate that this value is the result.

(7) In the embodiments, the number of processing threads in the multithreaded execution unit was described as two, but the number is not limited in this way, and may be any number two or greater.

For example, the number of processing threads may be four or eight.

(8) Embodiments 1-9 and the content of this Supplementary Explanation may be combined.

Supplementary Explanation 2

The embodiments correspond to the following aspects.

(1) A multithreaded parallel execution device according to the present embodiment comprises: an execution unit operable to divide repetitions of a loop process into a plurality of threads to execute the repetitions in parallel; a reception unit operable to receive a combination of a value and a sequential position for each thread while the execution unit is executing the repetitions in parallel, the value indicating a result of executing a repetition in the thread, and the sequential position being a position of the repetition within the loop process; a storage unit for storing the combination of the value and the sequential position; a control unit operable, when the reception unit receives the combination of the value and the sequential position, to selectively overwrite the combination of the value and the sequential position stored in the storage unit with the received combination of the value and the sequential position in accordance with whether the received sequential position is prior or subsequent to the sequential position stored in the storage unit; and a determining unit operable, when the execution unit finishes executing the repetitions in parallel, to determine the value stored in the storage unit to be a result of executing the loop process.

(2) A breakpoint for interrupting processing may be set in one or more repetitions in the loop process. In addition to the value and the sequential position, the combination received by the reception unit may include a flag indicating whether the breakpoint has been reached. The storage unit may be for storing the combination of the value, the sequential position, and the flag. The control unit may determine whether to overwrite the combination by comparing the sequential position and the flag in the combination received by the reception unit with the sequential position and the flag stored in the storage unit.

With this structure, final values are also guaranteed during loop processes that have breakpoints set therein.

(3) The control unit need not overwrite the combination when the value stored in the storage unit corresponds to a repetition with a breakpoint that is first reached assuming sequential processing of the loop process.

(4) When the reception unit receives the combination, the control unit may overwrite the combination in the storage unit with the received combination of the value and the sequential position when the received sequential position is subsequent to the sequential position stored in the storage unit, and not overwrite the combination in the storage unit with the received combination of the value and the sequential position when the received sequential position is prior to the sequential position stored in the storage unit.

(5) The repetitions in the loop process may be iterations, and the sequential position may be an iteration number indicating a position within a sequence of iterations.

(6) The reception unit, the control unit, and the determining unit may be implemented as a management thread that is executed by the execution unit.

(7) Repetitions executed in parallel by the execution unit may be of a plurality of types. In addition to the combination, the reception unit may receive an identifier identifying the type of the repetition. The storage unit may store the combination in association with the identifier identifying the type of the repetition. The control unit may selectively overwrite the combination stored in association with the received identifier.

(8) The execution unit may issue at least one of a command to invalidate information stored by the storage unit, a command to transmit the combination to management hardware, and a command to copy the value stored by the storage unit into an actual variable.

(9) In (8), repetitions executed in parallel by the execution unit may be of a plurality of types. The combination received by the reception unit may include an identifier identifying the type of the repeating unit. The storage unit may store the combination in association with the identifier identifying the type of the repeating unit. The control unit may selectively overwrite the combination stored in association with the received identifier. Each command issued by the execution unit may include the identifier of a target of execution.

(10) A broadcast stream playback device comprises: a reception unit operable to receive a broadcast stream; a decoding unit operable to decode the received broadcast stream; and a playback unit operable to play back the decoded broadcast stream. The decoding unit may be composed by the multithreaded parallel execution device of (1).

(11) A broadcast stream storage device comprises: a reception unit operable to receive a broadcast stream; a re-encoding unit operable to re-encode the received broadcast stream; and a storage unit operable to store the re-encoded broadcast stream. The re-encoding unit may be composed by the multithreaded parallel execution device of (1).

(12) A stored stream playback device comprises: a storage unit operable to store a stream; a decoding unit operable to decode the stored stream; and a playback unit operable to play back the decoded stream. The decoding unit may be composed by the multithreaded parallel execution device of (1).

(13) A stored stream re-encoding device comprises: a storage unit operable to store a stream; and a re-encoding unit operable to re-encode the stored stream. The re-encoding unit may be composed by the multithreaded parallel execution device of (1).

(14) An integrated circuit comprises: an execution unit operable to divide repetitions of a loop process into a plurality of threads to execute the repetitions in parallel; a reception unit operable to receive a combination of a value and a sequential position for each thread while the execution unit is executing the repetitions in parallel, the value indicating a result of executing a repetition in the thread, and the sequential position being a position of the repetition within the loop process; a storage unit for storing the combination of the value and the sequential position; a control unit operable, when the reception unit receives the combination of the value and the sequential position, to selectively overwrite the combination of the value and the sequential position stored in the storage unit with the received combination of the value and the sequential position in accordance with whether the received sequential position is prior or subsequent to the sequential position stored in the storage unit; and a determining unit operable, when the execution unit finishes executing the repetitions in parallel, to determine the value stored in the storage unit to be a result of executing the loop process.

(15) The execution unit may be implemented by a multithreaded processor.

(16) The execution unit may be implemented by a multi-core processor.

(17) A multithreaded parallel execution method according to the present embodiment comprises: an execution step of causing an execution unit to divide repetitions of a loop process into a plurality of threads and to execute the repetitions in parallel; a reception step of receiving a combination of a value and a sequential position for each thread while the execution unit is executing the repetitions in parallel during the execution step, the value indicating a result of executing a repetition in the thread, and the sequential position being a position of the repetition within the loop process; a storage step of storing the combination of the value and the sequential position in a storage unit; a control step of, when the combination of the value and the sequential position is received during the reception step, selectively overwriting the combination of the value and the sequential position stored in the storage unit with the received combination of the value and the sequential position in accordance with whether the received sequential position is prior or subsequent to the sequential position stored in the storage unit; and a determining step of determining, when execution of the repetitions in parallel is complete during the execution step, the value stored in the storage unit to be a result of executing the loop process.

(18) A multithreaded compiler according to the present embodiment is for compiling a source program operating in one processing thread and including loop processes, the multithreaded compiler generating a plurality of processing thread programs that each transmit, each time a repetition in the loop process finishes, a combination of a value, indicating an execution result, and a sequential position of the repetition within the loop process, and a data updating management thread program that, upon receiving the combination from each processing thread, compares the sequential position included in the combination with a sequential position already stored in a storage unit and selectively overwrites a combination of the value and the sequential position stored in the storage unit with the received combination of the value and the sequential position.

INDUSTRIAL APPLICABILITY

The multithreaded parallel execution device according to the present invention is useful in a multithreaded execution environment in which repetitions of a loop are divided into a plurality of threads and executed in parallel.

REFERENCE SIGNS LIST

101, 901, 1201, 2201 multithreaded parallel execution device
102, 902, 1202, 2202 multithreaded execution unit
103, 903, 2203 data updating management unit
104, 904, 2204 temporary data storage unit
105, 2205 final data storage unit
111, 911, 2211 reception unit
112, 912, 2212 storage control unit
113, 2213 completion judging unit
114, 2214 determining unit 1202a, 1202b processing thread
1203 data updating management thread
1302 multithreaded compiler
1501 integrated circuit
1601 broadcast stream playback device
1602 reception unit
1603 decoding unit
1604 playback unit
1701 broadcast stream storage device
1705 re-encoding unit
1706 storage unit
1801 stored stream playback device
1901 stored stream re-encoding device

The invention claimed is:

1. A multithreaded parallel execution device comprising:
an execution unit operable to divide repetitions of a loop process into a plurality of threads to execute the repetitions in parallel;
a reception unit operable to receive a combination of a value and a sequential position for each thread while the execution unit is executing the repetitions in parallel, the value indicating a result of executing a repetition in the thread, and the sequential position being a position of the repetition within the loop process;
a storage unit for storing the combination of the value and the sequential position;
a control unit operable, when the reception unit receives the combination of the value and the sequential position, to selectively overwrite the combination of the value and the sequential position stored in the storage unit with the received combination of the value and the sequential position in accordance with whether the received sequential position is prior or subsequent to the sequential position stored in the storage unit; and
a determining unit operable, when the execution unit finishes executing the repetitions in parallel, to determine the value stored in the storage unit to be a result of executing the loop process.

2. The multithreaded parallel execution device of claim 1, wherein
a breakpoint for interrupting processing is set in one or more repetitions in the loop process,
in addition to the value and the sequential position, the combination received by the reception unit includes a flag indicating whether the breakpoint has been reached,
the storage unit is for storing the combination of the value, the sequential position, and the flag, and
the control unit determines whether to overwrite the combination by comparing the sequential position and the flag in the combination received by the reception unit with the sequential position and the flag stored in the storage unit.

3. The multithreaded parallel execution device of claim 2, wherein
the control unit does not overwrite the combination when the value stored in the storage unit corresponds to a repetition with a breakpoint that is first reached assuming sequential processing of the loop process.

4. The multithreaded parallel execution device of claim 1, wherein
when the reception unit receives the combination, the control unit
overwrites the combination in the storage unit with the received combination of the value and the sequential position when the received sequential position is subsequent to the sequential position stored in the storage unit, and
does not overwrite the combination in the storage unit with the received combination of the value and the sequential position when the received sequential position is prior to the sequential position stored in the storage unit.

5. The multithreaded parallel execution device of claim 4, wherein
the repetitions in the loop process are iterations, and
the sequential position is an iteration number indicating a position within a sequence of iterations.

6. The multithreaded parallel execution device of claim 1, wherein
the reception unit, the control unit, and the determining unit are implemented as a management thread that is executed by the execution unit.

7. The multithreaded parallel execution device of claim 1, wherein
in addition to the combination, the reception unit receives an identifier of a managed variable,
the storage unit stores the combination in association with the identifier of the managed variable, and
the control unit selectively overwrites the combination stored in association with the received identifier.

8. The multithreaded parallel execution device of claim 1, wherein
the execution unit issues at least one of
a command to invalidate information stored by the storage unit,
a command to transmit the combination to management hardware, and
a command to copy the value stored by the storage unit into an actual variable.

9. The multithreaded parallel execution device of claim 8, wherein
the combination received by the reception unit includes an identifier of a managed variable,
the storage unit stores the combination in association with the identifier of the managed variable,
the control unit selectively overwrites the combination stored in association with the received identifier, and
each command issued by the execution unit includes the identifier of a target of execution.

10. A broadcast stream playback device comprising:
a reception unit operable to receive a broadcast stream;
a decoding unit operable to decode the received broadcast stream; and
a playback unit operable to play back the decoded broadcast stream, wherein
the decoding unit is composed by the multithreaded parallel execution device of claim 1.

11. A broadcast stream storage device comprising:
a reception unit operable to receive a broadcast stream;
a re-encoding unit operable to re-encode the received broadcast stream; and
a storage unit operable to store the re-encoded broadcast stream, wherein
the re-encoding unit is composed by the multithreaded parallel execution device of claim 1.

12. A stored stream playback device comprising:
a storage unit operable to store a stream;
a decoding unit operable to decode the stored stream; and
a playback unit operable to play back the decoded stream, wherein
the decoding unit is composed by the multithreaded parallel execution device of claim 1.

13. A stored stream re-encoding device comprising:
a storage unit operable to store a stream; and
a re-encoding unit operable to re-encode the stored stream, wherein
the re-encoding unit is composed by the multithreaded parallel execution device of claim 1.

14. An integrated circuit comprising:
an execution unit operable to divide repetitions of a loop process into a plurality of threads to execute the repetitions in parallel;
a reception unit operable to receive a combination of a value and a sequential position for each thread while the execution unit is executing the repetitions in parallel, the value indicating a result of executing a repetition in the thread, and the sequential position being a position of the repetition within the loop process;
a storage unit for storing the combination of the value and the sequential position;
a control unit operable, when the reception unit receives the combination of the value and the sequential position, to selectively overwrite the combination of the value and the sequential position stored in the storage unit with the received combination of the value and the sequential position in accordance with whether the received sequential position is prior or subsequent to the sequential position stored in the storage unit; and
a determining unit operable, when the execution unit finishes executing the repetitions in parallel, to determine the value stored in the storage unit to be a result of executing the loop process.

15. The integrated circuit of claim 14, wherein
the execution unit is implemented by a multithreaded processor.

16. The integrated circuit of claim 14, wherein
the execution unit is implemented by a multi-core processor.

17. A multithreaded parallel execution method comprising:
an execution step of causing an execution unit to divide repetitions of a loop process into a plurality of threads and to execute the repetitions in parallel;
a reception step of receiving a combination of a value and a sequential position for each thread while the execution unit is executing the repetitions in parallel during the execution step, the value indicating a result of executing a repetition in the thread, and the sequential position being a position of the repetition within the loop process;
a storage step of storing the combination of the value and the sequential position in a storage unit;
a control step of, when the combination of the value and the sequential position is received during the reception step, selectively overwriting the combination of the value and the sequential position stored in the storage unit with the received combination of the value and the sequential position in accordance with whether the received sequential position is prior or subsequent to the sequential position stored in the storage unit; and
a determining step of determining, when execution of the repetitions in parallel is complete during the execution step, the value stored in the storage unit to be a result of executing the loop process.

18. A multithreaded compiler embodied on a non-transitory computer readable medium for compiling a source program operating in one processing thread and including loop processes, the multithreaded compiler generating
a plurality of processing thread programs that each transmit, each time a repetition in the loop process finishes, a combination of a value, indicating an execution result, and a sequential position of the repetition within the loop process, and
a data updating management thread program that, upon receiving the combination from each processing thread, compares the sequential position included in the combination with a sequential position already stored in a storage unit and selectively overwrites a combination of the value and the sequential position stored in the storage unit with the received combination of the value and the sequential position.

\* \* \* \* \*